No. 709,431. Patented Sept. 16, 1902.
W. D. BAKER.
PROCESS OF PRESERVING FOOD PRODUCTS.
(Application filed Apr. 16, 1901.)
(No Model.)
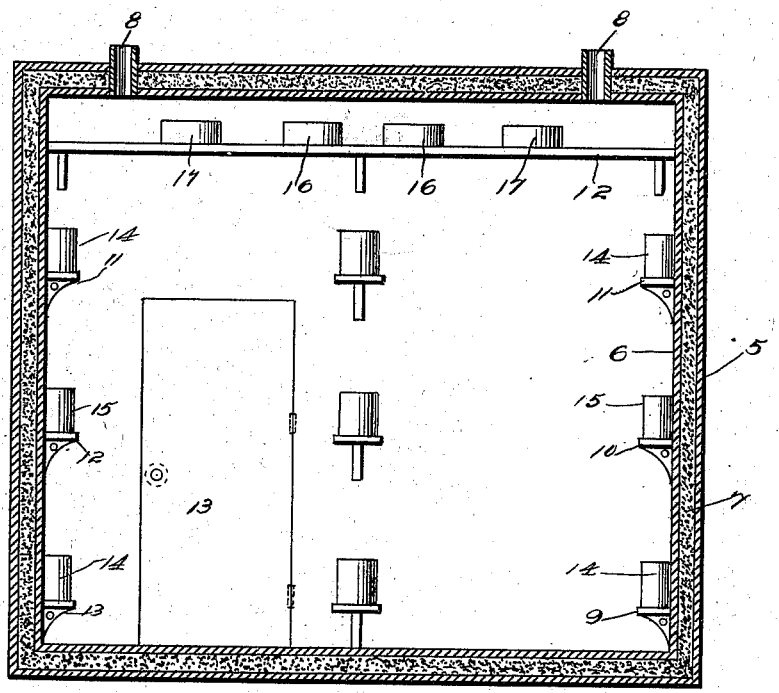

UNITED STATES PATENT OFFICE.

WILLARD D. BAKER, OF ROGERS, ARKANSAS, ASSIGNOR TO E. B. HARRINGTON, TRUSTEE, OF KANSAS CITY, MISSOURI.

PROCESS OF PRESERVING FOOD PRODUCTS.

SPECIFICATION forming part of Letters Patent No. 709,431, dated September 16, 1902.

Application filed April 16, 1901. Serial No. 56,106. (No specimens.)

*To all whom it may concern:*

Be it known that I, WILLARD D. BAKER, a citizen of the United States, residing at Rogers, in the county of Benton and State of Arkansas, have invented a new and useful Process of Preserving Food Products, of which the following is a specification.

This invention relates to the preservation of food products.

The object of the invention is in a simple, feasible, and thoroughly practical manner to effect prolonged preservation of food material without the employment of a refrigerant.

With these and other objects in view, as will appear as the nature of the invention is better understood, the same consists in the novel process of preserving fruits, eggs, and other perishable matter in their natural state, as will be hereinafter fully described and claimed.

In the accompanying drawing, forming a part of this specification, and in which like numerals of reference indicate corresponding parts, there is illustrated somewhat in the nature of a diagram a chamber or space provided with the means for effecting preservation of food materials, and in the drawing the figure is a view in sectional elevation of a chamber equipped with means for carrying out the process hereinafter described.

Referring to the drawing, 5 designates the outer wall of a chamber, and 6 the inner wall, the two being separated by a suitable lagging material—such as charcoal, cinders, or the like—whereby the temperature of the exterior atmosphere will not affect that of the chamber to any appreciable degree. In other words, the chamber is to be heat and frost proof. In the top of the chamber are arranged ventilators 8, which may be closed in any suitable manner when desired, and at suitable points on the walls of the chamber are secured shelves 9, 10, 11, and 12, a suitable tight-fitting door 13 being provided to permit access to the chamber. The shelves are to support receptacles for holding the chemicals used in carrying out the process.

In the preservation, say, of eggs these will first be candled and will then be placed in crates, with their small ends down. Assuming the capacity of the chamber to be eighteen hundred cubic feet, the following proportions of chemicals or materials will be employed, it being understood, of course, that the amounts stated may be varied, if found necessary or desirable. There is first taken four bushels of charcoal, and this is placed in suitable holders 14, which are closed by covers, and then subjected to a heat of 180° Fahrenheit to drive off any contained gases or moisture, and the contents of the vessels are allowed to cool while covered, after which they are placed upon the shelves 9 and 11, with the covers still on. Upon the shelves 10 are placed open vessels 15, containing potassium carbonate or some other salt having an affinity for moisture, the quantity used being twenty pounds, which is to be divided between the vessels. Upon the shelves 12 are placed vessels 16 and 17 in the nature of pans, and in the vessels 16 is placed a mixture of flour of sulfur iron and filings or turnings which have been thoroughly incorporated while dry and then converted into a heavy paste by the admixture of water, the proportions of the ingredients being twelve and one-half pounds of sulfur to fifty pounds of the iron and water as requisite. In the vessels 17 is placed a dry mixture of flour of sulfur, iron filings or turnings, and potassium carbonate, the proportions of the ingredients being twelve and one-half pounds of the sulfur, fifty pounds of the iron, and twenty pounds of the potassium carbonate, these vessels 17 being placed near the ventilators in the top of the chamber, as shown. The chemicals being thus disposed within the chamber and the crates containing the eggs being placed therein, the covers are removed from the vessels containing the charcoal and the door of the chamber is then closed. The functions performed by the different chemicals employed are as follows: The charcoal acts as an absorbent of moisture and gases and may be used repeatedly by being reheated to drive off the substances absorbed. The wet mixture of sulfur and iron operates as a deoxygenizing agent, inasmuch as as soon as the chamber is closed the oxygen contained in the atmosphere of the chamber unites with and oxidizes the sulfur and iron, causing heating thereof. During the period of deoxygenation the temperature of the atmosphere at the upper portion of the chamber is raised in a perceptible degree, this being due to the fact that the heat is evolved by the sudden action of the oxygen on the iron-sulfur mixture; but in a short time the temperature of the chamber drops to normal. Under the reaction stated practically all of the oxygen of the air within the chamber is consumed and there remains a pure and dry atmosphere, containing a greater than normal percentage of nitrogen.

The mixture of dry sulfur, iron, and potassium carbonate is placed in the vessels near the ventilators for the purpose of taking up a large percentage of the oxygen that may be admitted through the ventilators, the action of this mixture being very slow because of its dryness.

In preserving such food products as eggs it is not necessary to provide the chamber with ventilators if the chamber be made of some porous material, and where the preserving of the products is only to cover a short period of time, as in shipping fruits, the dry mixture of sulfur, iron, and potassium carbonate need not necessarily be employed.

The claims herein are specific to the process set forth, broad claims on the method common to this application and to application Serial No. 56,107 being embodied in my contemporaneous application, Serial No. 120,649, filed August 22, 1902.

Having thus fully described my invention, what I claim as new, and desire to secure by Letters Patent, is—

1. The process of preserving food products, which consists in confining them in a chamber, and subjecting the air of the chamber to the action of an iron-sulfur mixture in the presence of an absorbent for gases.

2. The process of preserving food products, which consists in confining them in a chamber, and subjecting the air in the chamber to the action of an aqueous mixture of sulfur and iron, and to that of charcoal.

3. The process of preserving food products, which consists in confining them in a chamber, and subjecting the air in the chamber to the action of an iron-sulfur mixture and to that of charcoal, and of a hygroscopic agent.

4. The process of preserving food products which consists in confining them in a chamber, and subjecting the air of the chamber to the action of an aqueous mixture of sulfur and iron, a dry mixture of iron, sulfur and potassium carbonate, and to an absorbent of gases and to a hygroscopic agent.

In testimony that I claim the foregoing as my own I have hereto affixed my signature in the presence of two witnesses.

WILLARD D. BAKER.

Witnesses:
E. B. HARRINGTON,
ANDREW E. CRAVER.